(12) United States Patent
Nishihara et al.

(10) Patent No.: US 7,653,346 B2
(45) Date of Patent: Jan. 26, 2010

(54) COMMUNICATION TERMINAL DEVICE, COMMUNICATION SYSTEM, COMMUNICATION METHOD, AND PROGRAM

(75) Inventors: Jun Nishihara, Kanagawa (JP); Hirofumi Shimizu, Kanagawa (JP)

(73) Assignee: Sony Corporation, Tokyo (JP)

( * ) Notice: Subject to any disclaimer, the term of this patent is extended or adjusted under 35 U.S.C. 154(b) by 698 days.

(21) Appl. No.: 11/368,373

(22) Filed: Mar. 3, 2006

(65) Prior Publication Data

US 2006/0206783 A1    Sep. 14, 2006

(30) Foreign Application Priority Data

Mar. 4, 2005 (JP) ............................. 2005-060751

(51) Int. Cl.
*H04Q 7/20* (2006.01)
(52) U.S. Cl. ........................ 455/7; 455/11.1; 455/15; 455/466; 455/426.1; 455/519; 370/312; 370/315; 370/338; 370/329; 370/328
(58) Field of Classification Search ............ 455/7, 455/11.1, 15, 500, 517, 518, 519, 466, 508, 455/426.1, 426.2, 422.1, 403, 445; 370/312, 370/229, 338, 328, 315, 329
See application file for complete search history.

(56) References Cited

U.S. PATENT DOCUMENTS

2003/0227934 A1* 12/2003 White et al. ............... 370/432

2005/0135242 A1* 6/2005 Larsen et al. .............. 370/229
2006/0018319 A1* 1/2006 Palin et al. ................. 370/390

FOREIGN PATENT DOCUMENTS

| JP | 2002-359621 | 12/2002 |
| JP | 2004-187297 | 7/2004 |

OTHER PUBLICATIONS

Notification of Reason(s) for Refusal dated Feb. 26, 2008, from the corresponding Japanese Application.
Notification of Reason(s) for Refusal, dated Aug. 26, 2008, for corresponding Japanese Patent Application JP 2005-060571.

* cited by examiner

*Primary Examiner*—Keith T Ferguson
(74) *Attorney, Agent, or Firm*—Katten Muchin Rosenman LLP

(57) ABSTRACT

A communication terminal device, a communication system, a communication method, and a program which allow efficient communication processing via multicast communication, along with power saving. The communication terminal devices includes a wireless communication unit comprising: a multicast ACK generating unit which makes it possible to transmit packets having an ACK function; a multicast ACK analysis unit which analyzes received packet data for ACK information; wireless transmission and reception units which perform modulation and demodulation processing; and a central control unit and a timing control unit which control these components. The ACK function is thus implemented by multicast packets in multicast communication. This makes it possible to check if its own transmission data is received by other stations (communication terminals).

13 Claims, 13 Drawing Sheets

ACK bit= 1 : ANY PACKET RECEIVED FROM THIS ST IN THE PREVIOUS INTERVAL
ACK bit= 0 : NO PACKET RECEIVED FROM THIS ST IN THE PREVIOUS INTERVAL

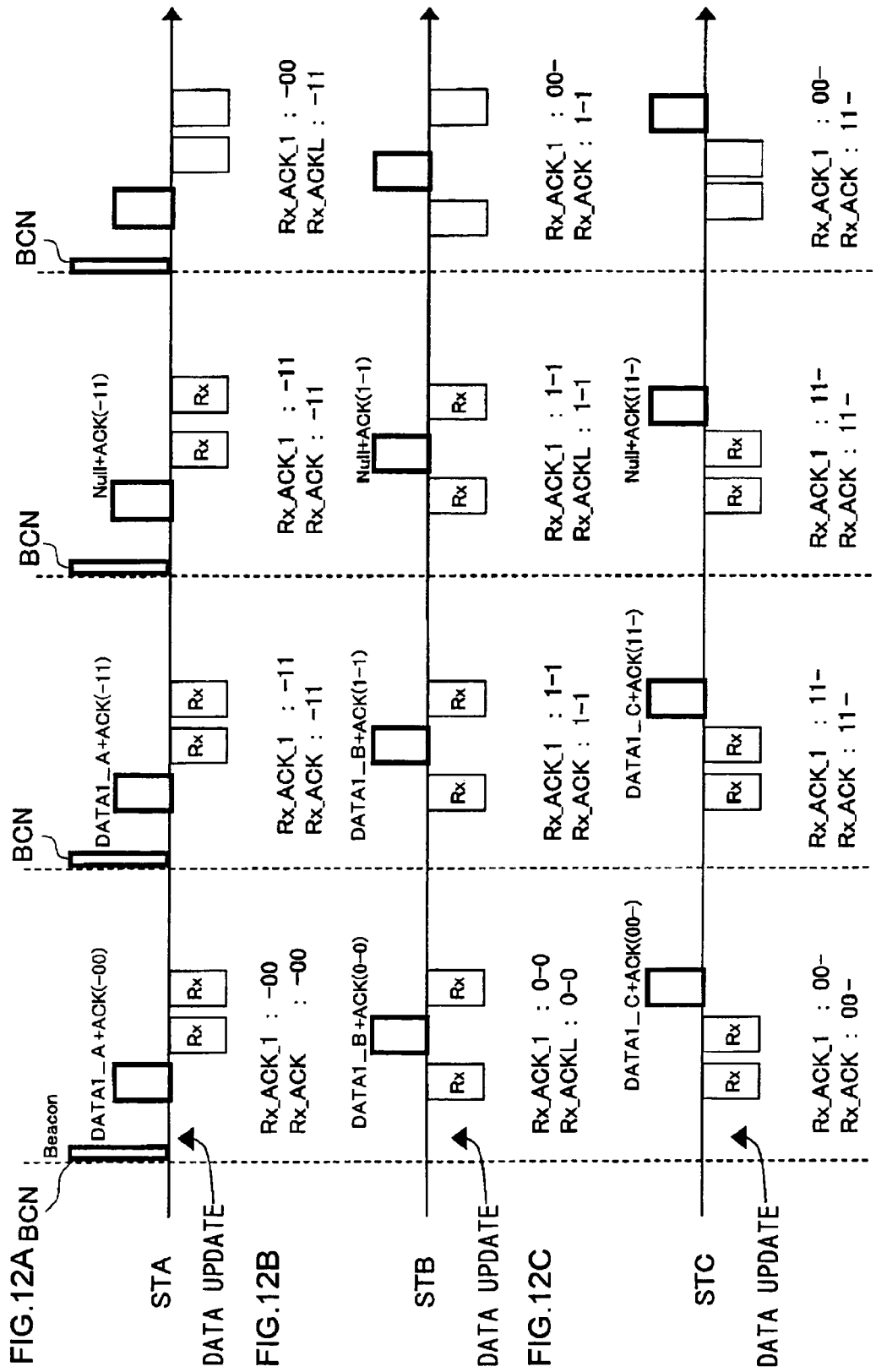

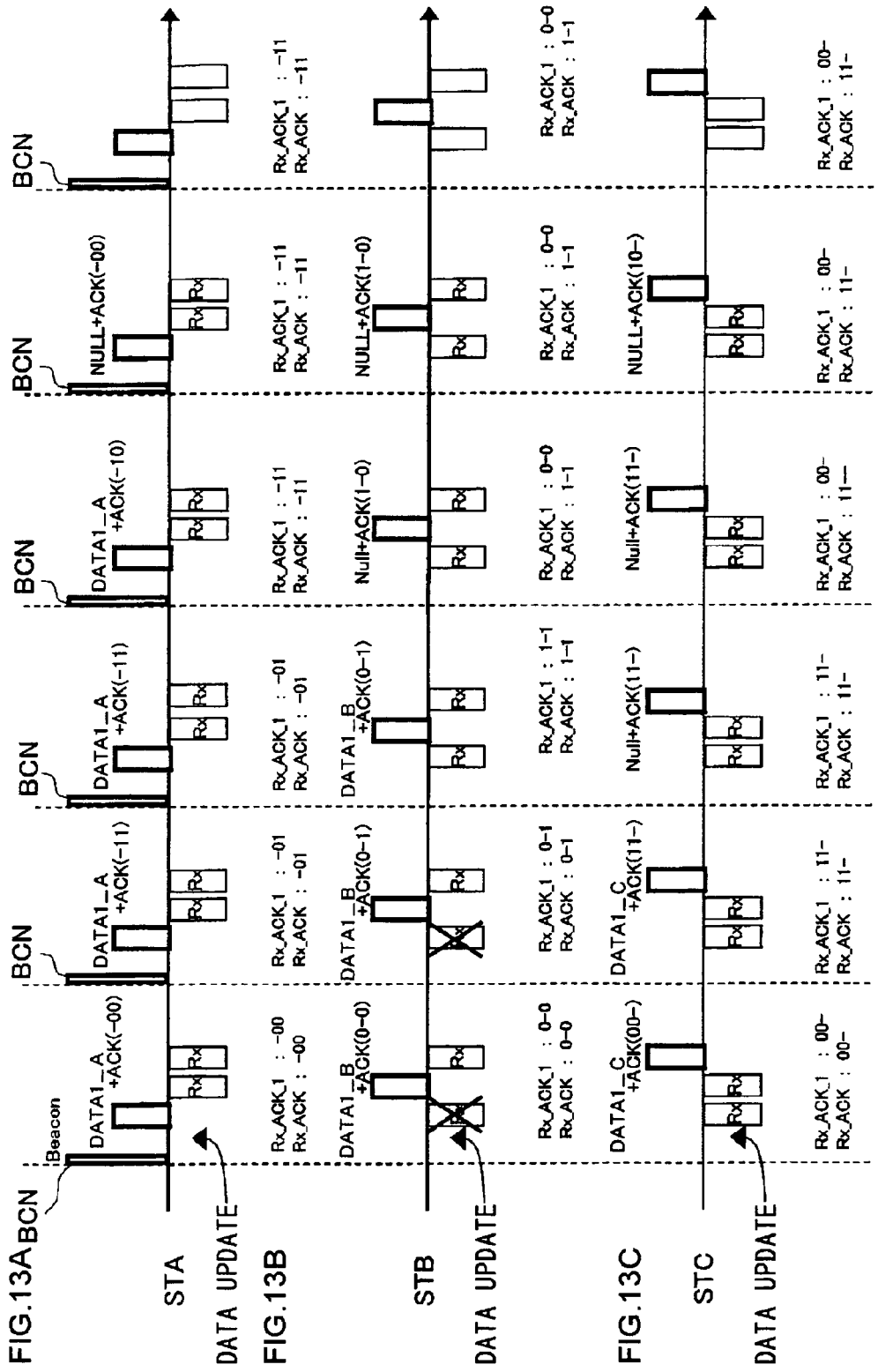

COMMUNICATION TERMINAL DEVICE, COMMUNICATION SYSTEM, COMMUNICATION METHOD, AND PROGRAM

BACKGROUND OF THE INVENTION

1. Field of the Invention

The invention relates to a technology by which a plurality of communication terminal devices communicate with one another.

2. Description of the Related Art

With the miniaturization and weight saving of information terminals in recent years, it has become common to carry information devices around. Considerable research has thus been done on the construction of a wireless ad-hoc network as what is called on-demand communication.

Since the ad-hoc network requires no base station or access point, it is easily possible to construct one even in locations with no such infrastructure.

For example, by using this ad-hoc network, a plurality of users can bring their portable game consoles to hold mutual wireless communication and enjoy a game together.

An ad-hoc network is constructed by terminals communicating with one another through the use of IEEE 802.11, Bluetooth, and other technologies. Unless external power supply is available full-time, portable terminals are driven by limited amounts of battery power. It is thus preferable to suppress battery consumption as much as possible. For that purpose, power control processing in power saving mode is standardized even in such communication standards as IEEE 802.11.

FIGS. 1A to 1D are timing charts showing station operations in a power saving mode, standardized in IEEE 802.11.

As shown in FIGS. 1A to 1D, one of stations (wireless communication terminal devices) STA, STB, STC and STD (STA to STD) initially transmits a beacon signal BCN. The beacon signal BCN is an annunciation signal which is communicated to all the stations.

A time window called ATIM (Announcement Traffic Indication Message) window is started in succession to the transmission of the beacon signal BCN. This window shows the time during which the nodes must be kept active.

In the power saving mode of the IEEE 802.11 standard, each of the stations can transmit an ATIM signal during the ATIM window so as to prevent other station(s) from sleeping.

In the example of FIGS. 1A to 1D, the station STB unicasts the ATIM signal to the station STC. The station STC returns an ACK (ACKnowledge) signal for acknowledging receipt to the station STB.

Since the stations STA and STD are not involved in transmission nor reception of the ATIM signal, they can enter a sleep state when the ATIM window ends.

On the other hand, neither of the stations STB and STC can enter sleep. After the end of the ATIM window, the station STB transmits data to the station STC. Receiving the data, the station STC returns the ACK signal to the station STB.

Before the end of this beacon interval BCNI, the stations STA and STD are activated to transmit or receive another beacon signal BCN. In the next ATIM window, none of the stations transmits or receives any ATIM signal. After the end of the ATIM window, all the stations STA to STD are thus in the sleep state.

The timing charts of FIGS. 1A to 1D have dealt with a quite simple case, for the sake of explaining the power saving mode of the IEEE 802.11 standard. When a plurality of portable game consoles construct a network, however, status information on each individual game console must be exchanged mutually, and thus more signals are communicated. In game applications that demand highly real-time responses, the status information must be updated frequently. It is thus preferable to transmit data via multicast communication.

As described previously, in unicast communication, whether or not data is actually transmitted properly is determined depending on if the ACK signal arrives from the reception side. When the ACK signal does not arrive, the data can be retransmitted on the assumption that there is a communication failure. In multicast communication, on the other hand, the absence of the ACK signal makes it impossible to check if data is delivered to the destinations. For that reason, multicast communication employs the method of keeping transmitting the same data for surer data transfer.

Nevertheless, the use of the foregoing method has the disadvantage that there is no way to check if transmitted data is received by the other stations (terminals). This means an increase in power consumption since the data is kept transmitted constantly even if it is received by the other stations (terminals). This increase in power consumption has an impact not only on the transmission side but also on the reception sides.

For example, as shown in FIGS. 2A to 2D, despite the successful reception by the other stations (terminals) in interval 1, the transmission is continued even in intervals 2, 3, and 4. Much of the transmission processing is unnecessary, merely increasing the power consumptions.

As seen above, if a plurality of stations (terminals) are involved in wireless communication, exchanging data by using multicast packets has the following two disadvantages.

A first disadvantage is an increase in power consumption ascribable to the continuous transmission. This increase in power consumption has an impact not only on the transmission side but on the reception sides as well.

A second disadvantage is that there is no means to know if data is received by the destinations due to the data exchange in multicast packets.

SUMMARY OF THE INVENTION

It is thus an object of the present invention to provide a communication terminal device, a communication system, a communication method, and a program which allow efficient communication processing via multicast communication, along with power saving.

A first aspect of the present invention is a communication terminal device capable of holding wireless communication with at least one other communication terminal device within a communication group, comprising: a transmission unit which transmits a packet to the at least one other communication terminal device within the communication group; a reception unit which receives a packet from the at least one other communication terminal device within the communication group; an analysis unit which identifies the at least one other communication terminal device which sends the packet received by the reception unit; and a control unit capable of adding reception acknowledge information which indicates whether the reception unit receives the packet from the individual communication terminal device or not to the packet for the transmission unit to transmit.

A second aspect of the present invention is a communication system comprising a plurality of communication terminal devices each capable of holding wireless communication with the at least one other communication terminal device within a communication group, the communication terminal devices each including: a transmission unit which transmits a packet to the at least one other communication terminal device within the communication group; a reception unit which receives a packet from the at least one other communication terminal device within the communication group; an analysis unit which identifies the at least one other communication terminal device which sends the packet received by the reception unit; and a control unit capable of adding reception acknowledge information which indicates whether the reception unit receives the packet from the individual communication terminal device or not to the packet for the transmission unit to transmit.

A third aspect of the present invention is a communication method for holding wireless communication with at least one other communication terminal device within a communication group, the method comprising: transmitting a packet to the at least one other communication terminal device within the communication group; receiving a packet from the at least one other communication terminal device within the communication group; identifying the at least one other communication terminal device which sends the packet received; and adding reception acknowledge information which indicates whether or not to receive the packet from the individual communication terminal device to the packet to be transmitted.

A forth aspect of the present invention is a computer program written in a computer-readable format so that processing for holding wireless communication with at least one other communication terminal device within a communication group is executed on a computer system, the program S comprising: transmitting a packet to the at least one other communication terminal device within the communication group; receiving a packet from the at least one other communication terminal device within the communication group; identifying the at least one other communication terminal device which sends the packet received; and adding reception acknowledge information which indicates whether or not to receive the packet from the individual communication terminal device to the packet to be transmitted.

Incidentally, any combinations of the foregoing components, and any conversions of expressions of the present invention from/into methods, apparatuses, systems, recording media, computer programs, and the like are also intended to constitute applicable aspects of the present invention.

BRIEF DESCRIPTION OF THE DRAWINGS

FIGS. 12A to 12C are diagrams for explaining the criteria for conversion between transmission data and Null, showing a first example of stopping transmission; and FIGS. 13A to 13C are diagrams for explaining the criteria for conversion between transmission data and Null, showing a second example of stopping transmission.

DETAILED DESCRIPTION OF THE INVENTION

Hereinafter, an embodiment of the present invention will be described in conjunction with the drawings.

Figure 1:
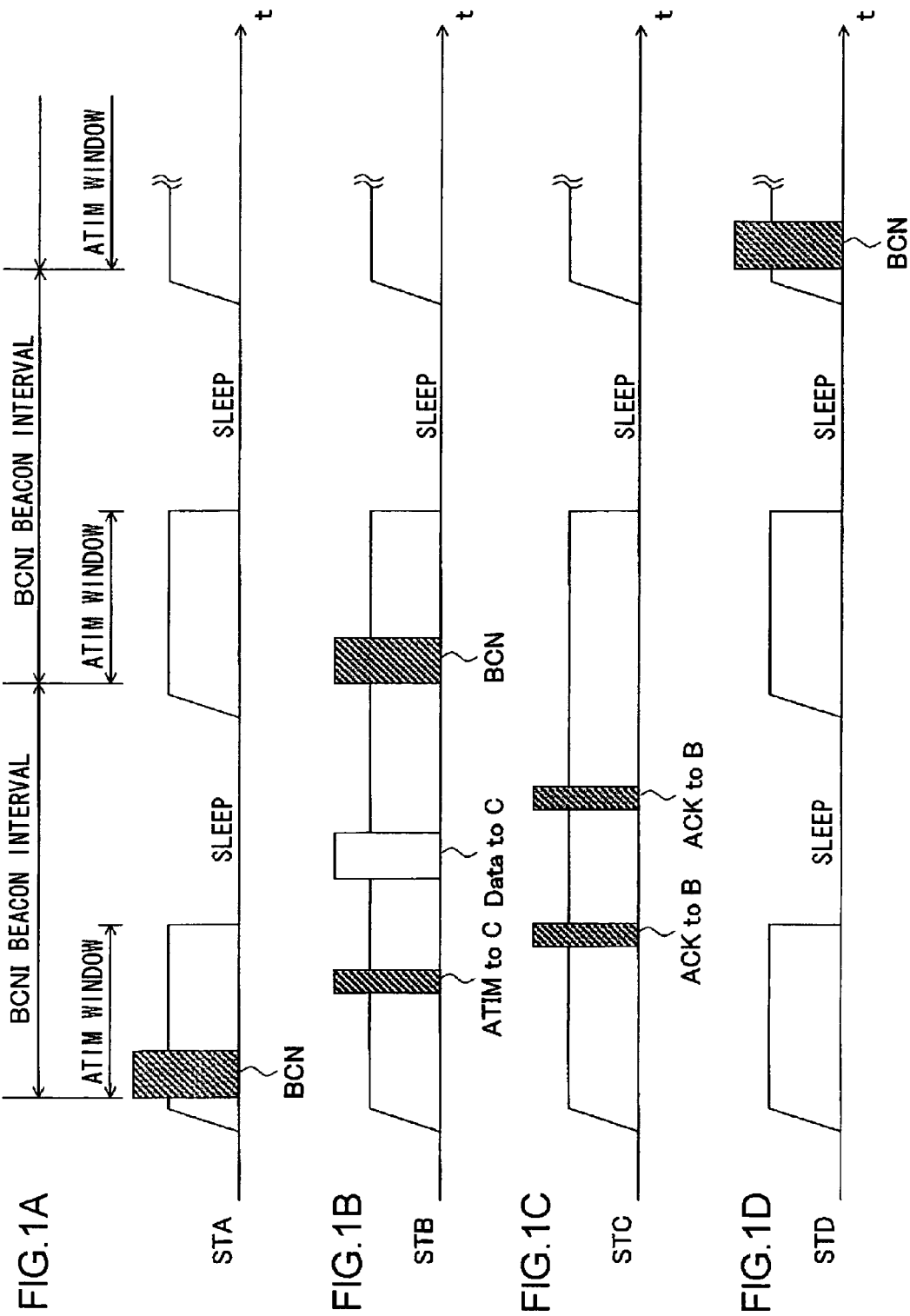
FIGS. 1A to 1D are timing charts showing station operations in power-saving mode of the IEEE 802.11 standard.
Figure 2:
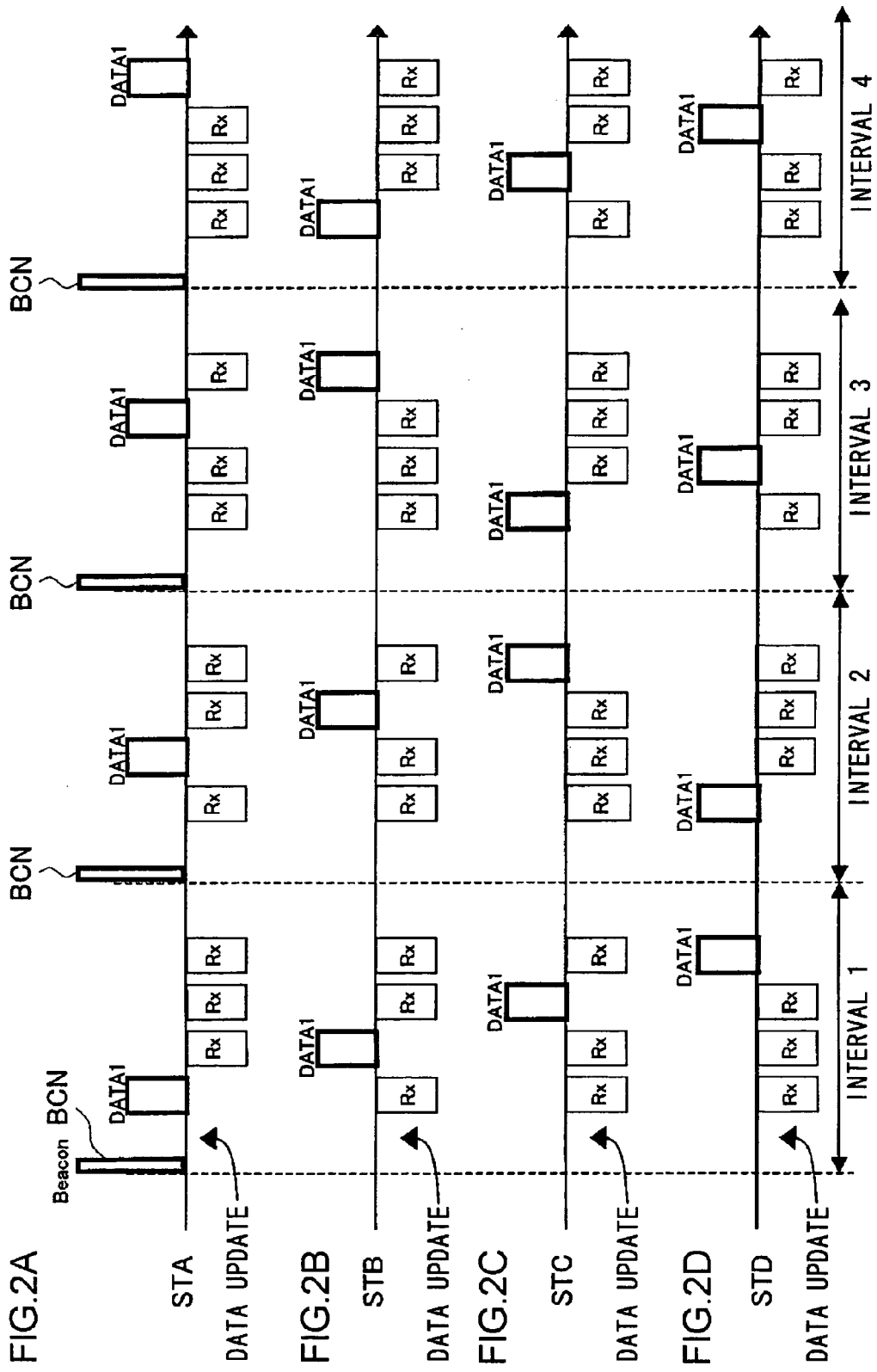
FIGS. 2A to 2D are diagrams for explaining an example of typical multicast communication with a number of transmissions of packets containing the same data.
Figure 3:
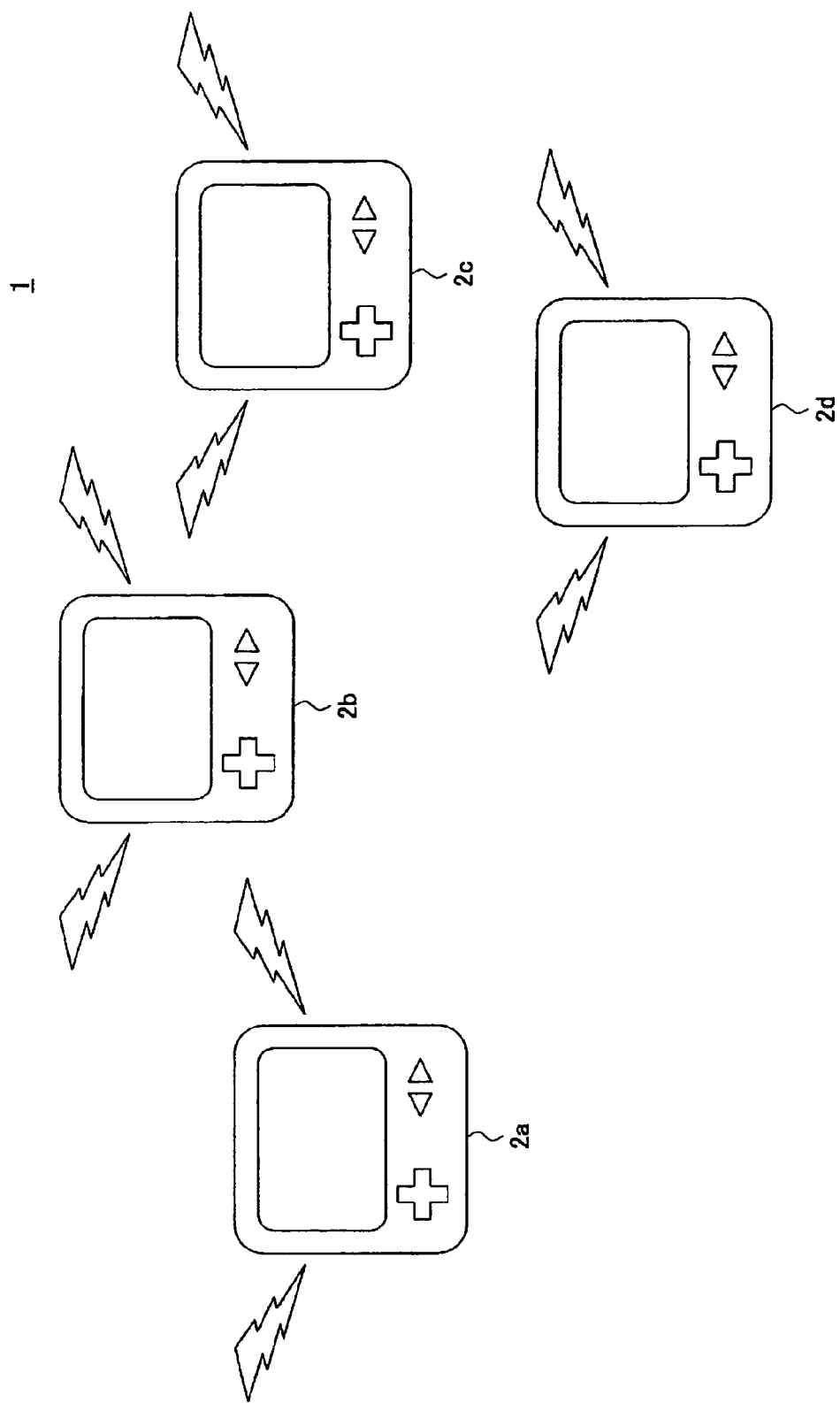
FIG. 3 is a diagram showing an example of configuration of a communication system according to an embodiment.

FIG. 3 is a diagram showing an example of configuration of a communication system according to the present embodiment.

In FIG. 3, the communication system 1 comprises a plurality of communication terminal devices (for the sake of convenience, hereinafter referred to as "communication terminals" or "stations"). Here, four game consoles 2a, 2b, 2c, and 2d are shown as the communication terminals. Incidentally, the number of game consoles 2 is not limited to four, but may be any number other than four.

The game consoles 2 (2a to 2d) have wireless communication functions. The plurality of game consoles 2a to 2d are gathered to construct a wireless network.

For example, IEEE 802.11b or other wireless LAN standards may be used to construct a wireless ad-hoc network. The IEEE-802.11b MAC layer technology adopts CSMA/CA (Carrier Sense Multiple Access with Collision Avoidance) access control mode, in which each terminal has the function of checking if a communication channel is idle for more than a certain period before data transmission. This waiting time is the minimum time plus a random duration of latency which is determined for each individual terminal. This prevents the plurality of terminals from making transmission simultaneously a certain period of time after the previous communication and thus causing signal collision.

In the present embodiment, each of the communication terminals performs multicast communication.

Then, if it is possible to acknowledge reception to the sender by using ACK in the multicast communication, transmission can be stopped with a reduction in the band occupation ratio and a reduction in power consumption.

Since the communication system 1 constructs an ad-hoc network, communications among the plurality of game consoles 2 (2a to 2d) can be achieved without requiring any additional infrastructure such as a base station and an access point.

Each individual game console 2 receives status information on the others, so that a plurality of players can play the same game application at the same time.

In the communication system 1, for the sake of avoiding signal collision among the communication terminals, the individual communication terminals determine their own transmission timing based on a beacon signal, or annunciation signal, which is transmitted from a coordinator within the network. In this function (collision avoidance mode), the order of transmission of the individual communication terminals can be changed upon each transmission. In the ad-hoc network, one of the communication terminals, or a group member, serves as the coordinator.

Game applications may be broadly classified into two groups in terms of real-time responses, i.e., ones that demand highly real-time responses and ones not. Among the examples of the games that demand highly real-time responses are beat'-em-up games and racing games. These games are of rapid progress, and input operations from users must be reflected immediately on outputs such as the game screens. Meanwhile, the examples of the games not demanding much real-time responses include board games such as chess and mah-jongg, and RPGs (role-playing games). These are of relatively slow progress.

The game screens are updated at predetermined frame rates or refresh rates. Currently, the overwriting rate for a single field is approximately 16.7 msec (1/60 sec).

With the game applications demanding highly real-time responses, i.e., that require small latency, a game console thus preferably notifies the other game consoles of its own status information and is notified of the status information on the others at least once in each single field (16.7 msec). For example, in a racing game, the status information refers to absolute information including course position, car direction, and speed.

Incidentally, the reason why absolute information is used here is that wireless environments are not high in communication reliability. If sufficient reliability is secured, past-present differential information will do.

In the communication system 1, the game consoles 2 execute an application asynchronously independent of each other. Incidentally, with game applications that do not require small latency, a failure to update data field by field would have little impact on the application processing since retransmission is available.

Hereinafter, description will be given of a multicast communication scheme in which the game consoles communicate directly with each other to realize the communication system 1.

For the communication standard, IEEE 802.11 protocols shall be used here. The IEEE 802.11 protocols have the advantage of easier Internet connection as compared to Bluetooth and other protocols. When the game consoles 2 adopt the IEEE 802.11 communication protocols, they can not only construct a wireless network but also access other terminals over the Internet. This improves the scalability of the communication system 1.

In the present embodiment, as mentioned previously, each individual game console (communication terminal, station) 2 performs multicast communication.

For IEEE 802.11 ad-hoc networks, BSSID (Basic Service Set ID) of random value is given to each network for the sake of distinction from the other networks.

Then, each of the stations includes BSSID into its data frames so that its own data can be multicast to the group of stations in the same base service area.

Incidentally, when communication protocols other than IEEE 802.11 are used, each station may designate the addresses of the other three stations for multicast communication.

Figure 4:
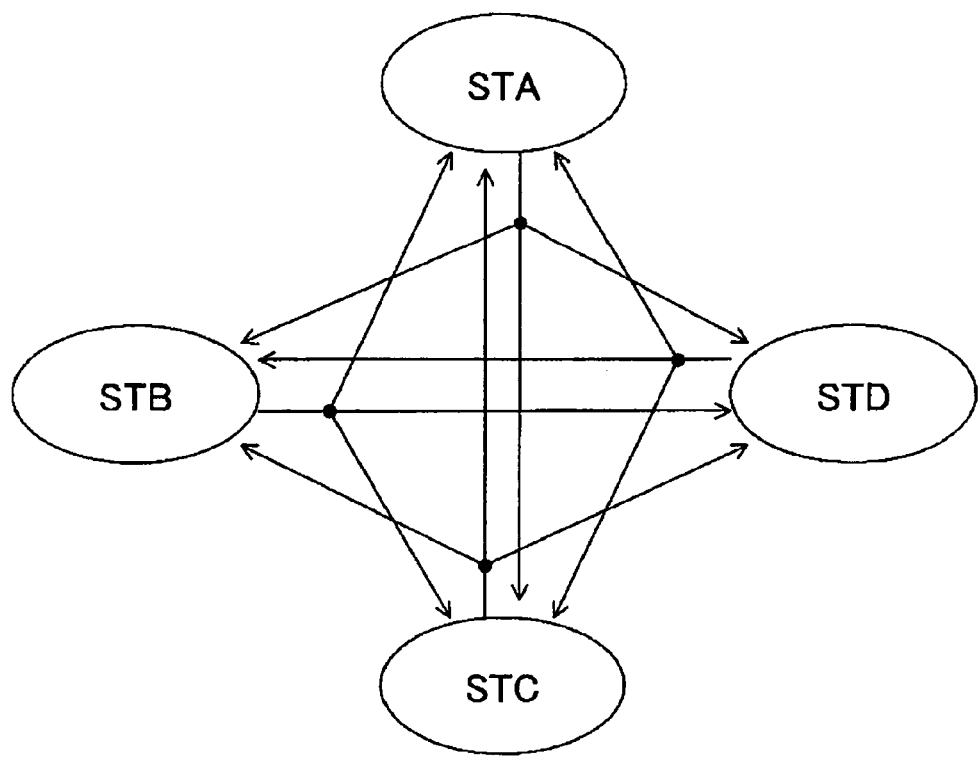
FIG. 4 is a diagram showing the state where each individual station is performing multicast communication.

FIG. 4 is a diagram showing the state where each station is multicasting the same data.

More specifically, the station STA includes BSSID into its data frame and transmits its status information in a single packet. The same holds for the stations STB, STC, and STD. As a result, in this multicast communication, the status information is communicated four times in total.

In the multicast communication according to the present embodiment, the ACK signals are then returned.

Nevertheless, if the ACK function is simply implemented in multicast communication, the stations (communication terminals) might have to transmit their respective ACK signals in response to the multicast packets. As a result, a large number of ACK signals might be transmitted with an increase in power consumption if the basic service set (BSS) includes a number of stations.

Thus, in this preferred embodiment, the multicast packets themselves are given the ACK function. This makes it possible to acknowledge reception to the others without band occupation. The number of transmissions is thus reduced to lower the power consumption.

Figure 5:
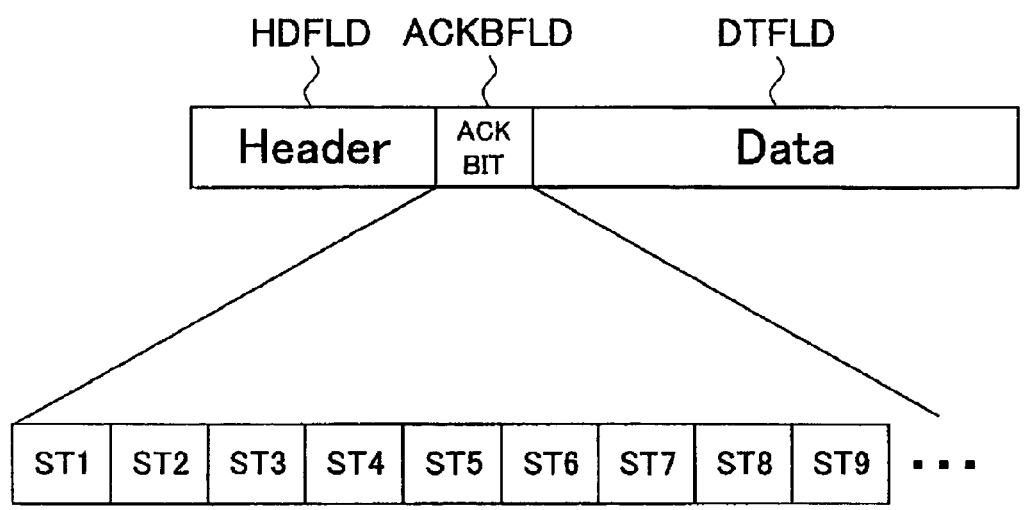
FIG. 5 is a diagram for explaining an example of ACK bits according to the present embodiment.

In the multicast communication scheme, the ACK function is implemented, for example, by adding ACT bits to part (head) of the multicast packet as shown in FIG. 5. The ACK bits are allocated for respective stations ST1 to STn.

In the example of FIG. 5, the ACK bit field ACKBFLD is arranged between a header field HDFLD and a data field DTFLD.

A transmitting station STn can acknowledge reception to a sender by transmitting the data with the bit of the received sender turned to "1."

Hereinafter, a concrete example of the multicast communication in the present embodiment will be described.

Figure 6:
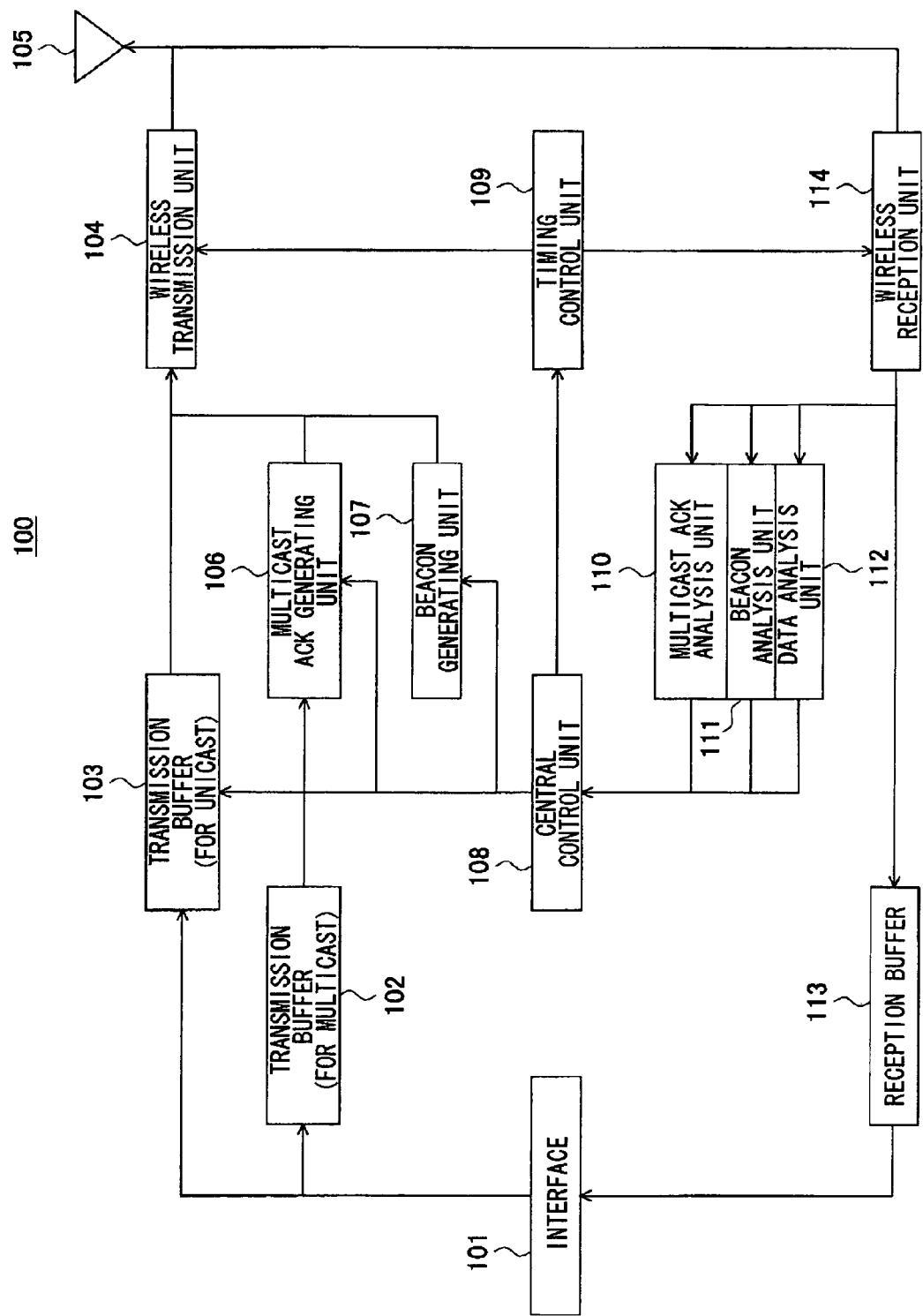
FIG. 6 is a block diagram showing an example of configuration of a wireless communication unit in each of the stations (communication terminals), used in the communication system which adopts a multicast communication scheme of the present embodiment.

FIG. 6 is a block diagram showing an example of configuration of a wireless communication unit in each of the stations (communication terminals), used in the communication system which adopts the multicast communication scheme of the present embodiment.

Note that the wireless communication unit of FIG. 6 is configured so that it is also capable of unicast communication.

The wireless communication unit 100 of FIG. 6 has an interface 101, a multicast transmission buffer 102, a unicast transmission buffer 103, a wireless transmission unit 104, an antenna 105, a multicast ACK generating unit 106, a beacon generating unit 107, a central control unit 108, a timing control unit 109, a multicast ACK analysis unit 110, a beacon analysis unit 111, a data analysis unit 112, a reception buffer 113, and a wireless reception unit 114.

The interface 101 exchanges various types of information with a not-shown application unit and the like in connection with this wireless communication unit 100, and with the transmission buffers 102 and 103 and the reception buffer 113.

The transmission buffer 102 temporarily stores multicast data transferred from the connected application unit and the like for the sake of wireless transmission.

The transmission buffer 103 temporarily stores unicast data transferred from the connected application unit and the like for the sake of wireless transmission.

The wireless transmission unit 104 is intended for the wireless transmission of the data stored in the transmission buffer 102, an ACK information generated by the multicast ACK generating unit 106, a beacon signal BCN generated by the beacon generating unit 107, and/or the unicast data temporarily stored in the transmission buffer 103. The wireless transmission unit 104 applies predetermined modulation processing to the signals, and emits the resultant to the transmission medium (into the air) through the antenna 105 at timing designated by the timing control unit 109.

The antenna 105 transmits the signals from the wireless transmission unit 104 toward other stations (wireless communication terminal devices) by air. The antenna 105 also collects signals transmitted from the other stations (wireless communication terminal devices) and supplies them to the wireless reception unit 114.

When a packet is received from another station in multicast communication, the multicast ACK generating unit 106 generates multicast ACK under the control of the central control unit 108. The generated multicast ACK is then supplied to the wireless transmission unit 104 as a multicast packet (NULL+ACK), or along with the data stored in the transmission buffer 102 as (DATA+ACK). Herein, "NULL" of (NULL+ACK) packet indicates that there is no data in the data field DTFLD shown in FIG. 5.

The multicast ACK generating unit 106 performs such processing as sets the ACK bits shown in FIG. 5.

The beacon generating unit 107 generates the beacon signal BCN which indicates the state of allocation of reception slots and ACK information on unicast data reception.

The central control unit 108 exercises sequence control on data communications in the entire unit, and control on the operation of scanning available reception slots.

The central control unit 108 has an ACK return timer. When the transmission buffer 102 has any data to transmit, the central control unit 108 determines whether or not a return of the ACK information is required on that data. Only if the return of ACK information is required, the central control unit 108 activates the ACK return timer and controls the multicast ACK generating unit 106, the beacon generating unit 107, and the transmission buffer 103 in preparation of receiving packets containing ACK information from the destinations.

Under the control of the central control unit 108, the timing control unit 109 give timing specifications to the wireless transmission unit 104 and the wireless reception unit 114. The timing specifications include those of scan operations, and those of transmission and reception operations in predetermined slots.

The multicast ACK analysis unit 110 analyzes whether or not multicast ACK information transmitted from the other stations is received by the wireless reception unit 114. The analysis result is output to the central control unit 108.

The beacon analysis unit 111 analyses beacon signals BCN from the other stations (for example, a game coordinator), received by the wireless reception unit 114, for the timing and the positions of reception slots. The analysis result is output to the central control unit 108.

The data analysis unit 112 analyzes packets from the other stations, received by the wireless reception unit 114. The analysis result is output to the central control unit 108.

The reception buffer 113 stores the data that is received at the timing of the reception slots determined by this wireless communication unit 100.

The wireless reception unit 114 receives signals, such as beacon packets and data packets including data and/or ACK information, that are transmitted from the other stations (wireless communication terminal units) at predetermined timing designated by the timing control unit 109. The received signals are supplied to the multicast ACK analysis unit 110, the beacon analysis unit 111, the data analysis unit 112, and the reception buffer 113.

This wireless communication unit 100 can check if its own transmission data is received by the other stations (communication terminals), since the multicast packets in multicast communication have the ACK function.

To realize this function, the wireless communication unit 100 includes: the multicast ACK generating unit 106 which makes it possible to transmit packets having the ACK function; the multicast ACK analysis unit 110 which analyzes received packet data for ACK information; the wireless transmission and reception units 104 and 114 which perform modulation and demodulation processing; and the central control unit 108 and the timing control unit 109 which control these components.

In addition, since the multicast packets in multicast communication have the ACK function, the wireless communication unit 100 is configured accordingly so as to stop its own transmission processing under the control of the central control unit 108 when its transmission packet is received by the other stations (communication terminals).

To realize this function of stopping the transmission processing, the wireless communication unit 100 includes the following components, as is the case with the foregoing function of checking for data reception by the other stations. That is: the multicast ACK generating unit 106 which makes it possible to transmit packets having the ACK function; the multicast ACK analysis unit 110 which analyzes the received packet data for ACK information; the wireless transmission and reception units 104 and 114 which perform modulation and demodulation processing; and the central control unit 108 and the timing control unit 109 which control these components.

Moreover, since the multicast packets in multicast communication have the ACK function, the wireless communication unit 100 can transmit a multicast packet containing only ACK information, that is (NULL+ACK) packet, to reduce the transmission time, under the control of the central control unit 108.

To realize this function of transmitting ACK alone, the wireless communication unit 100 includes the following components, as is the case with the foregoing function of checking data reception by other stations. That is: the multicast ACK generating unit 106 which makes it possible to transmit packets having the ACK function; the multicast ACK analysis unit 110 which analyzes received packet data for ACK information; the wireless transmission and reception units 104 and 114 which perform modulation and demodulation processing; and the central control unit 108 and the timing control unit 109 which control these components.

Moreover, under the control of the central control unit 108, the wireless communication unit 100 can detect the degree of congestion of the channel used currently, and switch mode between stopping transmission of packets containing the same data and transmitting packets containing only ACK information.

Hereinafter, various functions implemented by the wireless communication unit 100 will be described in the concrete.

Initially, a specific example of stopping transmissions of packets containing the same data with which is acknowledged to be received by the other stations by means of implementing the ACK function will be described in conjunction with FIGS. 7A to 7D.

The shown example deals with situations where four stations STA, STB, STC and STD (STA to STD) constitute a BSS.

Initially, take the case where each of all the stations STA to STD updates its data stored in the transmission buffer 102 in interval INT1. Under the control of the central control unit 108, data DATA1_A-DATA1_D are transmitted from the antenna 105 to the other stations within the BSS in multicast packets through the processing of the multicast ACK generating unit 106, the timing control unit 109, and the wireless transmission unit 104 of all the stations.

Figure 7:
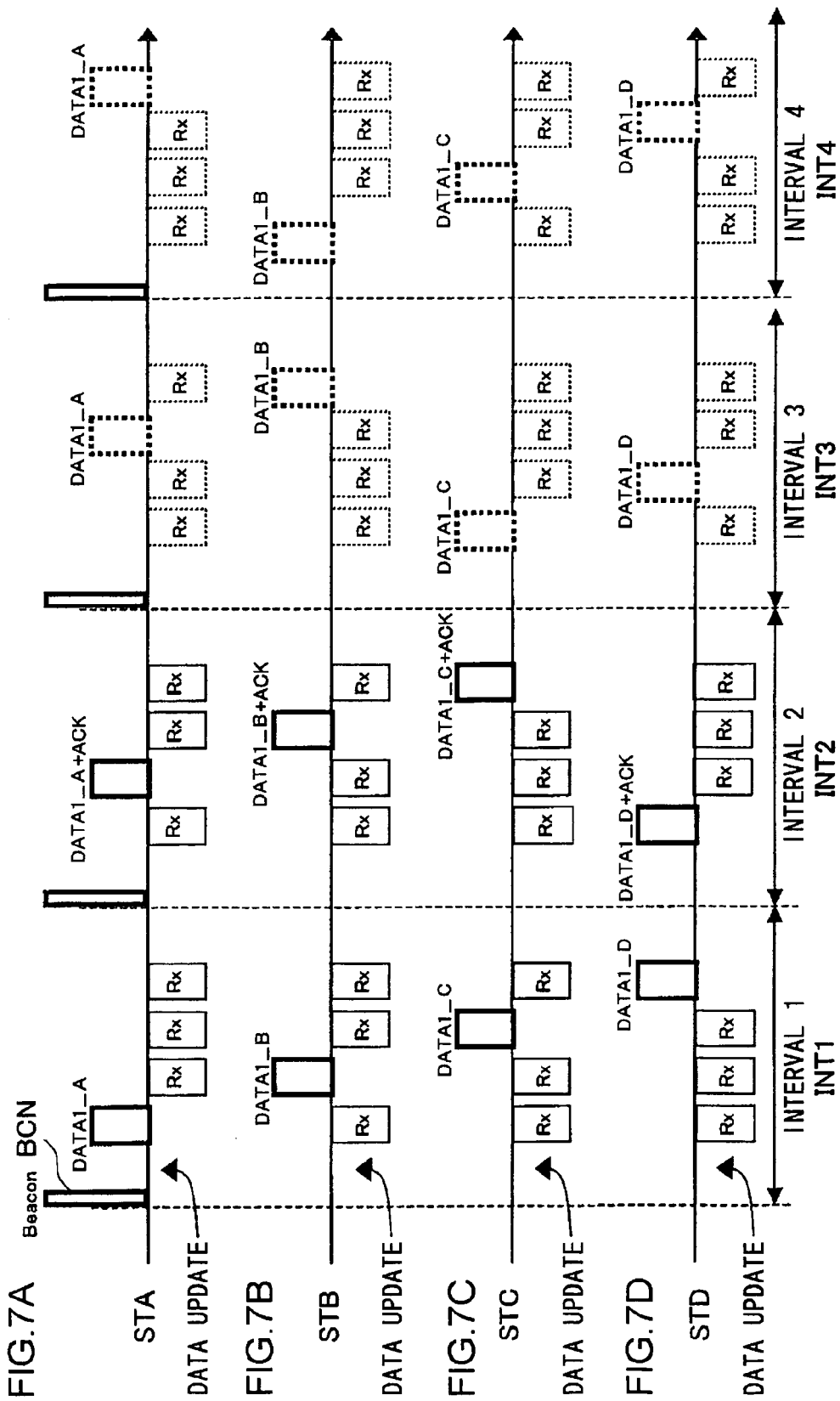
FIGS. 7A to 7D are diagrams for explaining a specific example where transmissions of packets containing the same data are stopped by means of implementing an ACK function.

Here, the station STA receives the multicast packets from all the other stations STB, STC, and STD (in FIG. 7A, the data transmission is followed by three successive receptions Rx)

successfully. Under the control of the central control unit 108, the multicast ACK generating unit 106 adds the ACK function to the multicast packet to be transmitted in interval INT2 which contains the data DATA1_A sent in the previous interval INT1. More specifically, it sets the ACK bits corresponding to the stations STB, STC, and STD out of those shown in FIG. 5 to "1." The multicast packet given the ACK function (DATA1_A+ACK) is transmitted through the wireless transmission unit 104.

Similarly, in the stations STB, STC, and STD, the ACK bits corresponding to the successfully received stations ST are also set to "1," and the multicast packets given the ACK function (DATA1-B+ACK), (DATA1_C+ACK), (DATA1_D+ACK) are transmitted.

In interval INT2, as shown in FIGS. 7A to 7D, the station STA checks the ACK bits in the multicast packets transmitted from the stations STB, STC, and STD via the wireless reception unit 114, the ACK analysis unit 111, the central control unit 108, etc. The station STA can thus be acknowledged that the data DATA1_A transmitted in interval INT1 is received by all the other stations. Consequently, the station STA stops transmission of the multicast packet containing the same data with DATA1_A transmitted in interval INT1 from interval INT3 under the control of the central control unit 108.

Similarly, the station STB also checks the ACK bits in the multicast packets from the other stations STA, STC, and STD, and stops transmission of the multicast packet containing the same data with DATA1_B transmitted in interval INT1 since the reception of all the stations ST is acknowledged.

This method can be used to reduce the number of transmissions of packets containing the same data already received by the other stations, which makes it possible to reserve the band and reduce the power consumption.

The transmission is stopped when all the following three conditions hold.

A first condition is that reception of its own transmission packet by all the other stations (communication terminals) is acknowledged. That is, the first condition is that the station checks the ACK bits in the multicast packets from the other stations and confirms that all ACK bits indicate reception of the transmitted packet.

A second condition is that there is no data update of higher order so that new data is not stored in the transmission buffer 102.

A third condition is that ACK information need not be returned to the other stations.

Next, the processing for stopping and restarting transmission will be described in conjunction with FIGS. 8A to 8D.

Figure 8:
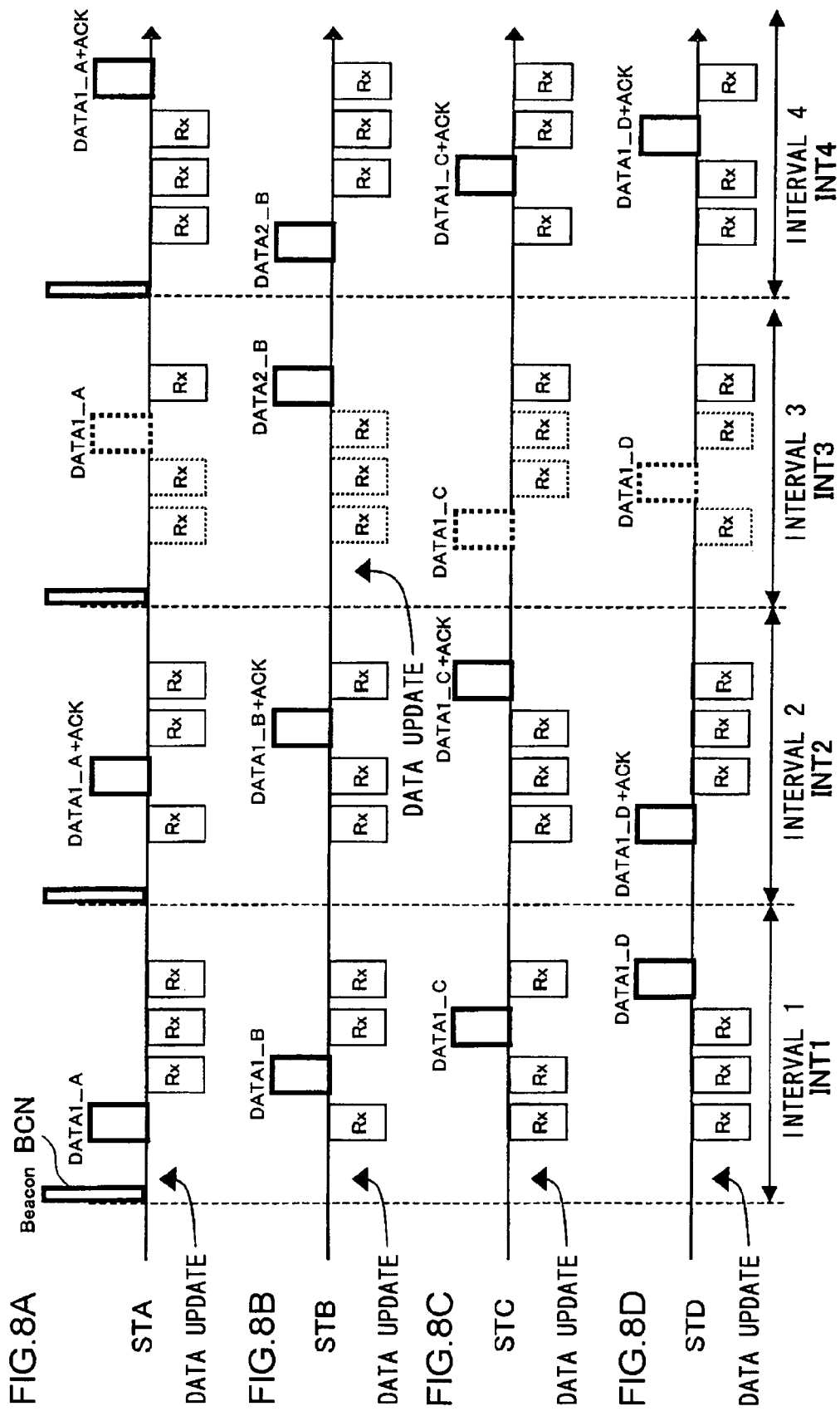
FIGS. 8A to 8D are diagrams for explaining the processing for stopping and restarting transmissions.
Figure 9:
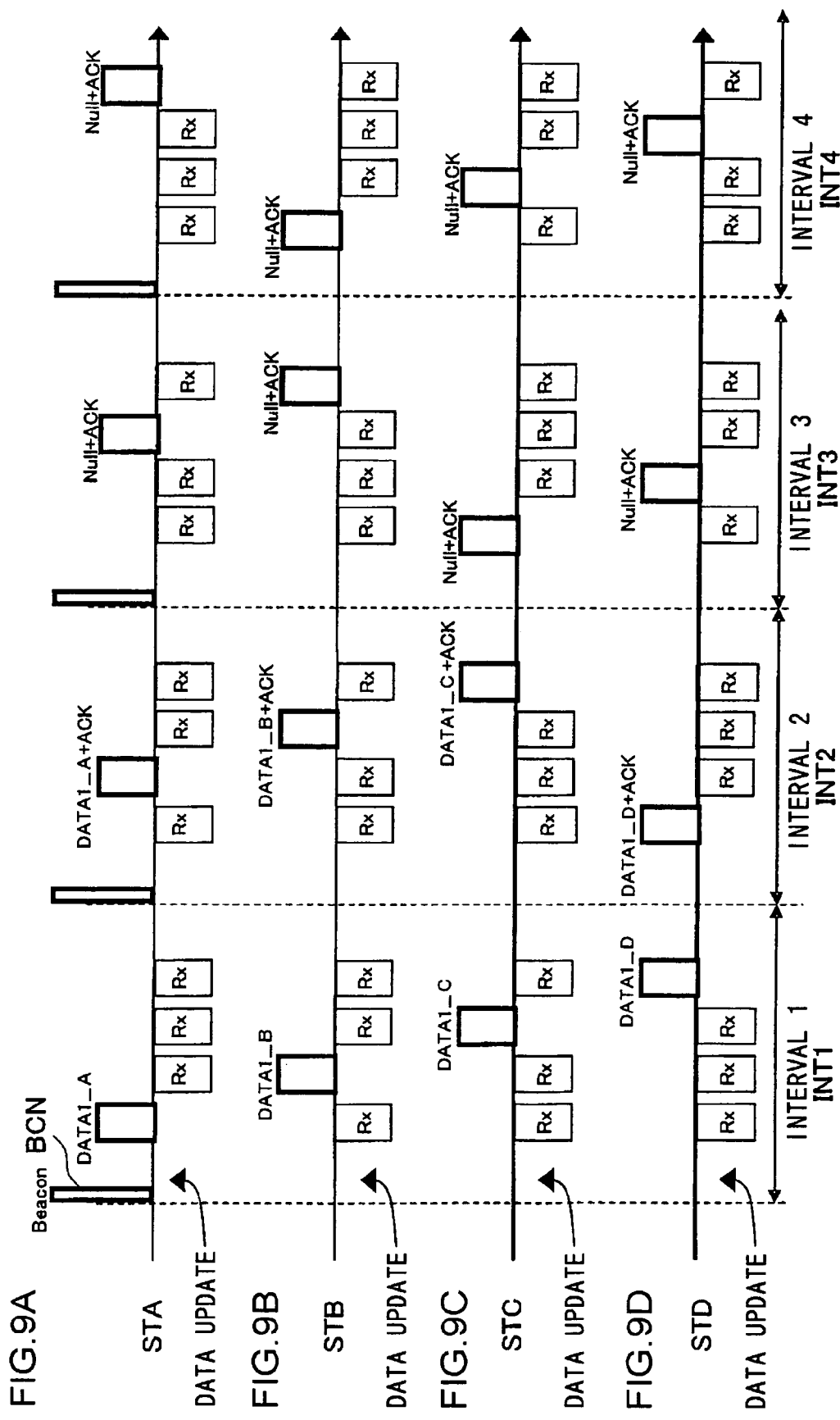
FIG. 9A to 9D are diagrams for explaining the processing for shrinking transmission packets, thereby reducing the transmission time without stopping transmissions.

As shown in FIG. 8B, the station STB updates data to be transmitted in interval INT3. The station STB thus transmits data DATA2_B through the ACK generating unit 106 and the wireless transmission unit 104 under the control of the central control unit 108.

The stations STA, STC, and STD restart transmission in order to return packets including ACK information, that is (DATA1_A+ACK), (DATA1_C+ACK) and (DATA1_D+ACK) respectively to the station STB in interval INT4.

It is preferred that the stations enter a sleep state when they are not required to be active. With this method, none of the stations ST can enter the sleep state soon after receiving multicast packets from all the other stations ST because the stations ST have to send multicast packets containing ACK information and data. In general, the sleep state shall refer to one in which only part of a wireless interface is rendered operating or capable of operation with extremely low power consumption by such means as interrupting a current to a bias circuit of the transceiver unit (chiefly consisting of analog circuits) of the wireless interface, and stopping the clock for a modem unit and/or a MAC unit of the same. In the communication system 1 of the present embodiment, each of the stations ST is thus put into the sleep state by the medium being idle for a certain period of time.

By the way, when the foregoing method is used in the presence of a plurality of other BSSs, exchanging enormous amounts of data, the medium may hardly be idle for the certain period of time. This might reduce the time of being in a sleep state, with an increase in power consumption.

For the sake of avoiding this problem, it is effective to shrink the transmission packets to reduce the transmission time.

Next, in conjunction with FIGS. 9A to 9D, description will be given of the case of reducing the transmission time.

The processing is the same as in the foregoing case of stopping transmission, as far as the stations are acknowledged that their own transmission packet is received by the other stations (communication terminals).

A difference consists in that the stop of transmission is replaced with transmission of a packet including only the ACK bits, i.e., (NULL+ACK) without transmission of the data fields that have been so far.

Consequently, as compared to the case of stopping transmission of packets, it becomes possible to enter a sleep state with higher reliability, whereas the rate of reduction in the power consumption necessary for transmission decreases. This can often allow a reduction in power consumption as a whole.

Which of the foregoing two power saving methods is optimum, stopping transmission of a packet or transmitting a packet containing only the ACK bits, depends on the state of the medium.

Then, the optimum method of power saving can be selected by each station ST grasping the medium condition and making switching.

One of the methods for determining whether the medium is congested or not is to check the number of packets received from other BSSs when transmission is not stopped.

In another method, the transmission may be actually stopped to measure the time until a sleep state is entered.

Moreover, the foregoing determination may be made by one of the stations in the BSS and notified to the other stations along with beacon information.

Up to this point, description has been given of the basic configuration of the communication system 1 according to the present embodiment, and of the processing pertaining to the implementation of the ACK function in multicast communication, including acknowledging data transfer, stopping transmissions of packets containing the same data with which is acknowledged to be received by the other stations, stopping and restarting transmissions, and reducing the transmission time.

For a still preferred example, description will hereinafter be given in detail of ACK-based conditions for sleeping and awakening, and of multicast communication processing using ACK bits.

<Conditions for Sleeping>

Basically, each station ST enters a sleep state when either of the following two conditions holds.

A first condition is that its own transmission is completed and the transmitted packets of all the other stations ST are received.

A second condition is that the medium is idle for a certain period of time.

The first condition is intended to enter a sleep state after necessary operations so as to minimize the time of being awake uselessly.

The second condition is intended to sleep even when the reception of packets from other stations ST fails. In general, the time setting for the second condition is longer than a transmission interval in an ordinary game BSS.

When ACK is used to stop transmission of packets including the same data as in the present embodiment, the sleep state is entered under the second condition alone.

As described above, the time setting for the second condition is rendered sufficiently longer than the timing of is transmission of the other stations STn. Thus, if any of the other stations ST undergoes data update and restarts transmission, it is possible to receive the packet before entering sleep.

<Conditions for Awakening>

In the communication system 1 consisting of a plurality of game consoles (communication terminals), the game coordinator must transmit the annunciation signal, or beacon signal BCN, without exception. The non game coordinators must receive the beacon signal BCN without exception.

In other words, all the stations ST always awaken autonomously before the timing for transmitting or receiving the beacon signal BCN, even if they have no data to transmit of their own.

<Details of Multicast Communication Processing Using ACK Bits>

In the present embodiment, each of the stations ST has two tables, or a first table (Table 1: Rx_Packet) which shows information received from the other stations and a second table (Table 2: Rx_ACK) which shows whether or not its own transmission packet is delivered to the others.

In each station ST, the multicast ACK analysis unit 110 creates the first table Rx_Packet which contains the ID numbers (ID#) of other stations ST whose packets are not received properly. The multicast ACK analysis unit 110 also detects the ID numbers (ID#) of the transmitting stations in the headers of the multicast packets transmitted from the is other stations ST, and reads the ACK bits corresponding to its own station ID number (ID#) to create the second table Rx_ACK. Then, the multicast ACK analysis unit 110 notifies the tables to the central control unit 108.

The information in the first table Rx_Packet transferred to the multicast ACK generating unit 106 via the central control unit 108 is updated by each beacon interval BCNI. The information is registered into the ACK bit field ACKBFLD of the multicast packet. That is, the information in the ACK bit field ACKBFLD indicates whether or not the respective pieces of data from the other stations ST are received in the previous beacon interval BCNI.

The second table Rx_ACK reflects the ACK information as to its own transmission packet, given from the other stations ST. The central control unit 108 uses this second table Rx_ACK to determine whether or not the conditions not to transmit a multicast packet hold, and then controls the multicast ACK generating unit 106. The second table Rx_ACK is reset when data is updated from an upper layer.

Assuming now the case where four stations (game consoles) STA to STD constitute a network as shown in FIG. 4, description will be given of specific examples of the settings of the transmission packets, the first tables Rx_Packet, and the second tables Rx_ACK of the respective stations STA to STD in conjunction with FIG. 10.

Figure 11:
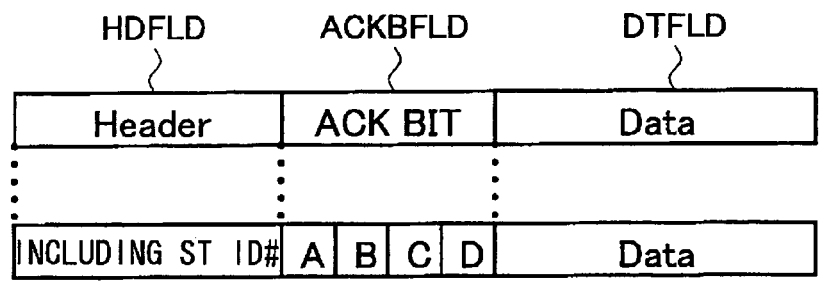
FIG. 11 is a diagram showing an example of configuration of a transmission packet in the case of FIG. 10.

In this case, transmission packets PCKT are configured as shown in FIG. 11. That is, the header field HDFLD contains information including the ID of the station ST. The ACK bit field ACKBFLD contains bit data corresponding to the stations STA to STD including itself. The data field DTFLD contains data.

When an ACK bit is set to "1," it indicates that the packet from the corresponding station ST, allocated for that bit in the previous interval, is received properly.

When an ACK bit is set to "0," it indicates that the packet from the corresponding station ST, allocated for that bit in the previous interval, is not received properly.

Figure 10:
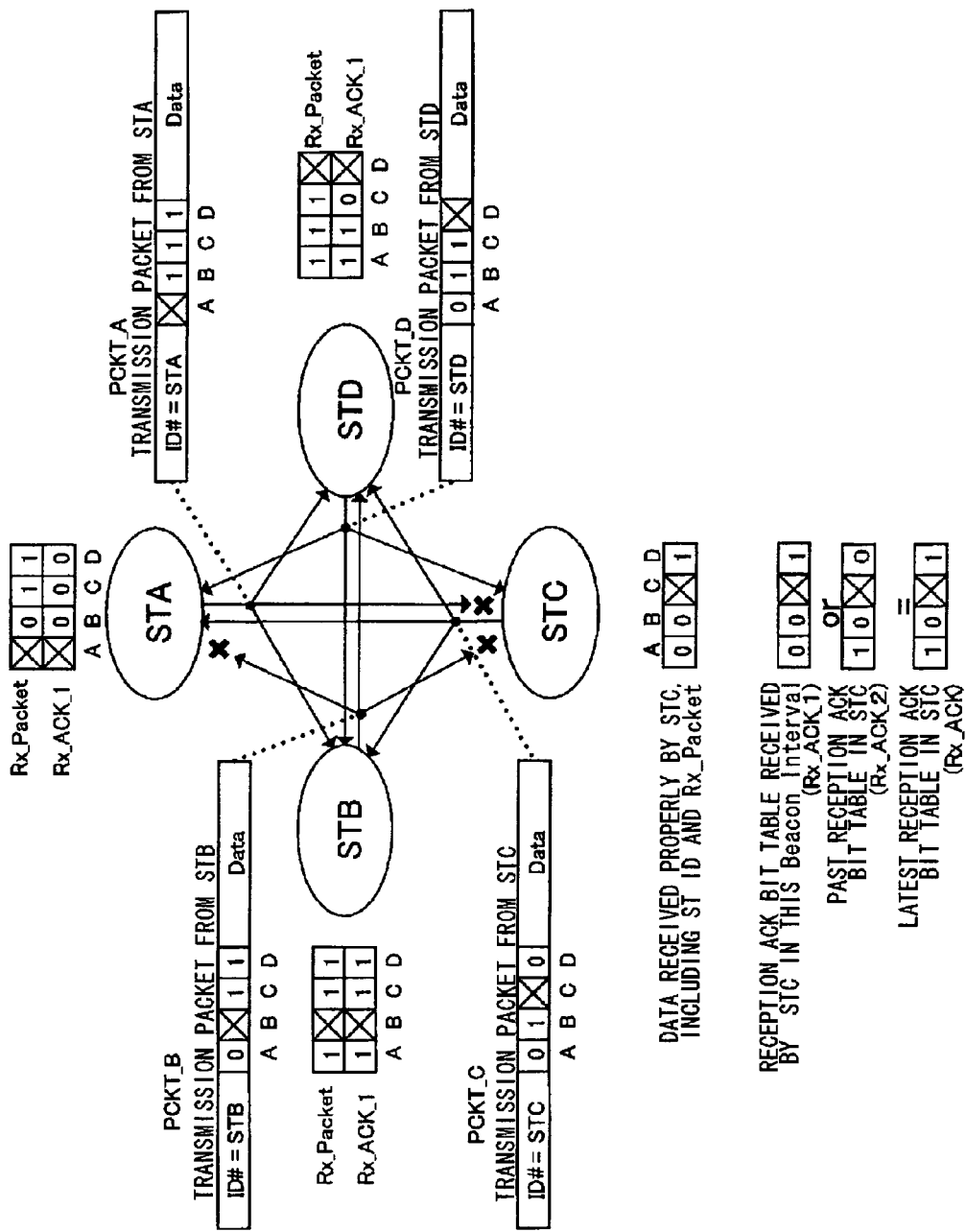
FIG. 10 is a diagram for explaining specific examples of settings of the transmission packets, first tables Rx_Packet, and second tables Rx_ACK in the network comprising four stations STA to STD.

The example of FIG. 10 shows the case where the station STA failed to receive the packet PCKTB from the station STB, and the station STC failed to receive the packet PCKTA from the station STA and the packet PCKTB from the station STB, as a result of the current multicast communication.

In the example of FIG. 10, the ACK bits in the transmission packet PCKTA from the station STA show that the station STA received packets from the stations STB, STC, and STD in the previous interval.

The first table Rx_Packet of the station STA shows that the station STA does not receive the current packet from the station STB properly but from the stations STC and STD.

The second table Rx_ACK of the station STA shows that the station STA does not receive ACK information from any of the stations STB, STC, and STD.

The ACK bits in the transmission packet PCKTB from the station STB shows that the station STB did not receive the packet of the station STA but those of the stations STC and STD in the previous interval.

The first table Rx_Packet of the station STB shows that the station STB receives the current packets of the stations STA, STC, and STD properly.

The second table Rx_ACK of the station STB shows that the station STB receives ACK information from all of the stations STA, STC, and STD.

The ACK bits in the transmission packet PCKTC from the station STC shows that the station STC did not receive the packet of the station STA or STD but that of the station STB in the previous interval.

The first table Rx_Packet of the station STC shows that the station STC does not receive the current packet from the station STA or STB properly but from the station STD.

The second table Rx_ACK of the station STC shows that the station STC does not receive ACK information from the station STA or STB but from the station STD.

The ACK bits in the transmission packet PCKTD from the station STD shows that the station STD did not receive the packet of the station STA but those of the stations STB and STC in the previous interval.

The first table Rx_Packet of the station STD shows that the station STD receives the current packets of the stations STA, STB, and STC properly.

The second table Rx_ACK of the station STD shows that the station STD receives ACK information from the stations STA and STB but not from the station STC.

The present embodiment will now be described, taking the station STC in FIG. 10 as an example. Each of the stations STA to STD (in the case of FIG. 10, the station STC) determines the logical sum (OR) of a second table (ACK bit table) Rx_ACK_2 which is received by the station itself in the past and the second table (ACK bit table) Rx_ACK_1 that is received in the foregoing beacon interval BCNI. The resultant reception ACK bit table Rx_ACK of that station ST(C) is used as the transmission-stopping (no-transmission) condition, providing the functions of reducing the processing time and saving power.

FIGS. 12A to 12C show the case where all the stations STA, STB, and STC communicate with each other successfully in a single interval after data update. FIGS. 13A to 13C show the case where the station STB fails to receive a packet from the station STA in two successive intervals after data update. In the diagrams, Rx_ACK_1 represents the ACK information that each station ST receives from the other stations ST in each individual interval (showing whether or not its transmission packet transmitted in the previous interval is received). Rx_ACK represents the result of the logical sum of the ACK information received in the previous intervals and Rx_ACK_1 mentioned above (showing the comprehensive status of reception of the ACK information received after data update).

1) Criteria for Conversion Between Transmission Data and Null

As shown in FIGS. 12A to 12C and FIGS. 13A to 13C, each of the stations STA to STC switches its transmission packet to (NULL+ACK) when all bits of its second table (ACK bit table) Rx_ACK_1 show "1" (needless to say, the station STD also has the same function).

Upon data update, the transmission packet is switched to one that includes data.

2) Set Data in the ACK Bit Field of the Packet to Transmit

The data in the first table Rx_Packet is simply set into the ACK bit field ACKBFLD of the packet to transmit (set '1' for pieces of data received in the previous TBTT (Target Beacon Transmission Time)).

3) Condition for Stopping Transmission

Transmission is stopped when all bits of the second table or reception ACK bit table Rx_ACK show "1" (=data of its own transmission packet is Null) and data of all the received packets from the other stations are Null.

4) Restart of Stopped Transmission

Transmission stop is released to restart transmission when there is any reception packet (Rx_Packet) from IBSS (Independent Basic Service Set), or when the station itself undergoes data update.

As has been described, according to the present embodiment, the wireless communication unit 100 comprises: the multicast ACK generating unit 106 which makes it possible to transmit packets having the ACK function; the multicast ACK analysis unit 110 which analyzes received packet data for ACK information; the wireless transmission and reception units 104 and 114 which perform modulation and demodulation processing; and the central control unit 108 and the timing control unit 109 which control these components. Since the multicast packets in multicast communication have the ACK function (reception acknowledgement function), the wireless communication unit 100 can check if its own transmission data is received by the other stations (communication terminals).

In addition, since the multicast packets in multicast communication have the ACK function, the wireless communication unit 100 can stop its own transmission processing under the control of the central control unit 108 when its transmission data is received by the other stations (communication terminals).

Since the multicast packets in multicast communication have the ACK function, the wireless communication unit 100 can also transmit a multicast packet containing ACK alone (NULL+ACK) to reduce the transmission time, under the control of the central control unit 108.

Moreover, under the control of the central control unit 108, the wireless communication unit 100 can detect the degree of congestion of the channel used currently, and switch mode between stopping the transmission processing and transmitting ACK alone.

In other words, according to the present embodiment, it is possible to check if transmitted data is delivered to the other stations (communication channels).

Since it is possible to check if transmitted data is delivered to all the stations, transmission can be stopped to reserve the band and reduce the power consumption.

Moreover, since it is possible to check if transmitted data is delivered to all the stations, packets containing ACK alone can be transmitted to reduce the amount of data, thereby reserving the band and reducing the power consumption.

Incidentally, the processing described above is recorded as a computer-processable program on a floppy disk, hard disk, optical disk, semiconductor memory, or the like. The program is read and executed by the terminal devices.

What is claimed is:

1. A communication terminal device capable of holding wireless communication with at least one other communication terminal device within a communication group, comprising:

a transmission unit which transmits a packet to the at least one other communication terminal device within the communication group;

a reception unit which receives a packet from the at least one other communication terminal device within the communication group;

an analysis unit which identifies the at least one other communication terminal device which sends the packet received by the reception unit; and a control unit capable of adding reception acknowledge information which indicates whether the reception unit receives the packet from the individual communication terminal device or not to the packet for the transmission unit to transmit, wherein when it is acknowledged that the packet transmitted via the transmission unit is received by the at least one other communication terminal device, the control unit stops transmission by the transmission unit of a packet containing the same data which is already included in the packet.

2. The communication terminal device according to claim 1, wherein the control unit is capable of checking the packets from the at least one other communication terminal device, received by the reception unit, for reception by the at least one other communication terminal device of the packet transmitted via the transmission unit.

3. The communication terminal device according to claim 1, wherein a multicast packet is transmitted by the transmission unit and received by the reception unit.

4. The communication terminal device according to claim 1, wherein the control unit stops the transmission of the packet on the condition that reception of all the at least one other communication terminal device is acknowledged; the data to be transmitted is not updated; and the reception acknowledge information needs not be returned to the at least one other communication terminal device.

5. The communication terminal device according to claim 1, wherein the control unit makes the transmission unit transmit a packet containing only the reception acknowledge information, when it is acknowledged that the packet transmitted via the transmission unit is received by the at least one other communication terminal device.

6. The communication terminal device according to claim 1, wherein
the control unit determines whether or not to stop the transmission of the packet by the transmission unit, at communication intervals corresponding to an annunciation signal, based on a status of reception of the reception acknowledge information from the at least one other communication terminal device and a past status of reception of the reception acknowledge information from the at least one other communication terminal device.

7. The communication terminal device according to claim 6, wherein
the control unit stops transmission by the transmission unit of the packet when it is acknowledged that the packet transmitted via the transmission unit is received by all the at least one other communication terminal device, based on the reception acknowledge information from the at least one other communication terminal device in or before the previous communication interval.

8. The communication terminal device according to claim 6, wherein
the control unit makes the transmission unit transmit a packet including information on the state of reception in the previous communication interval corresponding to the annunciation signal.

9. The communication terminal device according to claim 1, wherein
the control unit has
a first function of stopping transmission by the transmission unit of a packet containing the same data which is already included in the packet, when it is acknowledged that the packet transmitted via the transmission unit is received by the at least one other communication terminal device, and
a second function of making the transmission unit transmit a packet containing only the reception acknowledge information, when it is acknowledged that the data transmitted via the transmission unit is received by the at least one other communication terminal device; and
the first function and the second function are switched depending on a degree of channel congestion.

10. A communication system comprising a plurality of communication terminal devices each capable of holding wireless communication with the at least one other communication terminal device within a communication group,
the communication terminal devices each including:
a transmission unit which transmits a packet to the at least one other communication terminal device within the communication group;
a reception unit which receives a packet from the at least one other communication terminal device within the communication group;
an analysis unit which identifies the at least one other communication terminal device which sends the packet received by the reception unit; and
a control unit capable of adding reception acknowledge information which indicates whether the reception unit receives the packet from the individual communication terminal device or not to the packet for the transmission unit to transmit, wherein
when it is acknowledged that the packet transmitted via the transmission unit is received by the at least one other communication terminal device, the control unit stops transmission by the transmission unit of a packet containing the same data which is already included in the packet.

11. The communication system according to claim 10, wherein
the control unit has
a first function of stopping transmission by the transmission unit of a packet containing the same data which is already included in the packet, when it is acknowledged that the packet transmitted via the transmission unit is received by the at least one other communication terminal device, and
a second function of making the transmission unit transmit a packet containing only the reception acknowledge information, when it is acknowledged that the data transmitted via the transmission unit is received by the at least one other communication terminal device; and
the first function and the second function are switched depending on a degree of channel congestion.

12. A communication method for holding wireless communication with at least one other communication terminal device within a communication group, the method comprising:
transmitting a packet to the at least one other communication terminal device within the communication group;
receiving a packet from the at least one other communication terminal device within the communication group;
identifying the at least one other communication terminal device which sends the packet received; and
adding reception acknowledge information which indicates whether or not to receive the packet from the individual communication terminal device to the packet to be transmitted, wherein
when it is acknowledged that the packet transmitted is received by the at least one other communication terminal device, stopping transmission of a packet containing the same data which is already included in the packet.

13. A computer program written in a computer-readable format so that processing for holding wireless communication with at least one other communication terminal device within a communication group is executed on a computer system, the program comprising:
transmitting a packet to the at least one other communication terminal device within the communication group;
receiving a packet from the at least one other communication terminal device within the communication group;
identifying the at least one other communication terminal device which sends the packet received; and
adding reception acknowledge information which indicates whether or not to receive the packet from the individual communication terminal device to the packet to be transmitted, wherein
when it is acknowledged that the packet transmitted is received by the at least one other communication terminal device, stopping transmission of a packet containing the same data which is already included in the packet.

* * * * *

UNITED STATES PATENT AND TRADEMARK OFFICE
CERTIFICATE OF CORRECTION

PATENT NO. : 7,653,346 B2
APPLICATION NO. : 11/368373
DATED : January 26, 2010
INVENTOR(S) : Jun Nishihara et al.

Page 1 of 1

It is certified that error appears in the above-identified patent and that said Letters Patent is hereby corrected as shown below:

Title Page, item (73) should read as follows:

(73) Assignees: Sony Corporation, Tokyo (JP)
Sony Computer Entertainment, Inc., Tokyo (JP)

Signed and Sealed this
Third Day of May, 2011

David J. Kappos
*Director of the United States Patent and Trademark Office*